(12) United States Patent
Kapur

(10) Patent No.: US 9,361,351 B2
(45) Date of Patent: Jun. 7, 2016

(54) DATA MANAGEMENT VIA ACTIVE AND INACTIVE TABLE SPACE CONTAINERS

(71) Applicant: International Business Machines Corporation, Armonk, NY (US)

(72) Inventor: Deepam Kapur, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 14/023,507

(22) Filed: Sep. 11, 2013

(65) Prior Publication Data

US 2015/0074150 A1 Mar. 12, 2015

(51) Int. Cl.
*G06F 17/30* (2006.01)

(52) U.S. Cl.
CPC .................. *G06F 17/30584* (2013.01)

(58) Field of Classification Search
None
See application file for complete search history.

(56) References Cited

U.S. PATENT DOCUMENTS

| | | | | |
|---|---|---|---|---|
| 6,598,058 B2 * | 7/2003 | Bird | ............ | G06F 17/30595 |
| 7,305,379 B2 | 12/2007 | Goyal et al. | | |
| 2010/0023521 A1 * | 1/2010 | Arcese | ............ | G06F 17/30362 |
| | | | | 707/E17.007 |
| 2011/0231447 A1 * | 9/2011 | Starkey | ............ | G06F 17/30575 |
| | | | | 707/792 |

* cited by examiner

*Primary Examiner* — Belix M Ortiz Ditren
(74) *Attorney, Agent, or Firm* — Patrick J. Daugherty; Driggs, Hogg, Daugherty & Del Zoppo Co., LPA

(57) ABSTRACT

Aspects distribute database data to table space containers as a function of active and inactive node designations. Different groups of active and inactive logical nodes are created in response to integrating a relational database on one or more physical servers. Database node groups are created by marking the active nodes as available for use in data storage and distribution, and the inactive nodes as unavailable. Table space is created for the relational database by defining containers for each of the active and inactive nodes.

17 Claims, 3 Drawing Sheets

DATA MANAGEMENT VIA ACTIVE AND INACTIVE TABLE SPACE CONTAINERS

FIELD OF THE INVENTION

The present invention relates to the management of relational model database structures that provide an interface between a database administrator and an information database.

BACKGROUND

A database organized in terms of a relational model is a relational database. The relational model provides a declarative method for specifying data and queries. Users may directly state what information the database contains and what information they want from the database, wherein a database management system describes data structures for storing the data and retrieval procedures for answering queries.

A relational database is generally a database that is treated as a set of tables and manipulated in accordance with the relational model of data. It contains a set of objects used to store, manage, and access data. Examples of such objects are tables, views, indexes, functions, triggers, and packages.

A partitioned relational database is a relational database whose data is managed across multiple partitions (also called nodes). This separation of data across partitions is transparent to users of most Structured Query Language (SQL) statements. Some data definition language (DDL) statements take partition information into consideration. DDL may be referred to as a subset of SQL statements that are used to describe data relationships in a database.

IBM® DB2® is a relational model database server developed by International Business Machines Corporation. (IBM and DB2 are trademarks of International Business Machines Corporation in the United States or other countries.) DB2 is organized around a hierarchy of database objects. The highest-level object in the hierarchy is a system, which represents an installation of DB2. A control center maintains a list of known systems and records information needed to communicate with each system (for example, network address, operating system, communication protocol, etc.). A system can have one or more DB2 instances, each of which can manage one or more databases.

An "instance" or "database manager" is a DB2 structure that manages data, controlling what can be done to the data and managing assigned system resources. Each instance is a complete environment, containing all the database partitions defined for a given parallel database system. An instance has its own databases (which other instances generally cannot access), and all its database partitions share the same system directories. An instance also has separate security from other instances on the same computing device, machine or system.

A relational database is organized into parts called table spaces and presents data as a collection of tables. A table consists of a defined number of columns and any number of rows. Each database includes a set of system catalog tables that describe the logical and physical structure of the data, a configuration file containing the parameter values allocated for the database, and a recovery log with ongoing transactions and transactions to be archived.

A table space is a storage structure containing tables, indexes and data. In creating a table, certain objects such as indexes and large object data may be kept separately from the rest of the table data. A table space can also be spread over one or more physical storage devices. A database partition group is a set of one or more database partitions. Creating tables for a database generally necessitates first creating a database partition group where the table spaces will be stored, and then table space for storage of the tables.

Table spaces generally consist of containers that describe where objects are stored. Examples of containers include a directory name, a device name, a file name and a subdirectory in a file system. When data is read from table space containers, modified, or held during processing, it is placed in an area of memory called a buffer pool. A buffer pool is associated with a specific table space, thereby allowing control over which data will share the same memory areas for data buffering.

BRIEF SUMMARY

In one aspect of the present invention, a method for distributing data of a database to table space containers as a function of active and inactive node designations includes a processor creating different groups of active and inactive logical nodes in response to integrating a relational database on one or more physical servers. The processor creates database node groups by marking the active nodes as available for use in data storage and distribution, and the inactive nodes as unavailable. The processor further creates table space for the relational database by defining containers for each of the active and inactive nodes.

In another aspect, a system has a processor, computer readable memory and a computer-readable storage medium with program instructions, wherein the processor, when executing the stored program instructions, creates different groups of active and inactive logical nodes in response to integrating a relational database on one or more physical servers. The processor also creates database node groups by marking the active nodes as available for use in data storage and distribution, and the inactive nodes as unavailable. The processor further creates table space for the relational database by defining containers for each of the active and inactive nodes.

In another aspect, a computer program product has a computer-readable storage medium with computer readable program code embodied therewith, the computer readable program code comprising instructions that, when executed by a processor, cause the processor to create different groups of active and inactive logical nodes in response to integrating a relational database on one or more physical servers. The processor also creates database node groups by marking the active nodes as available for use in data storage and distribution, and the inactive nodes as unavailable. The processor further creates table space for the relational database by defining containers for each of the active and inactive nodes.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Figure 1:
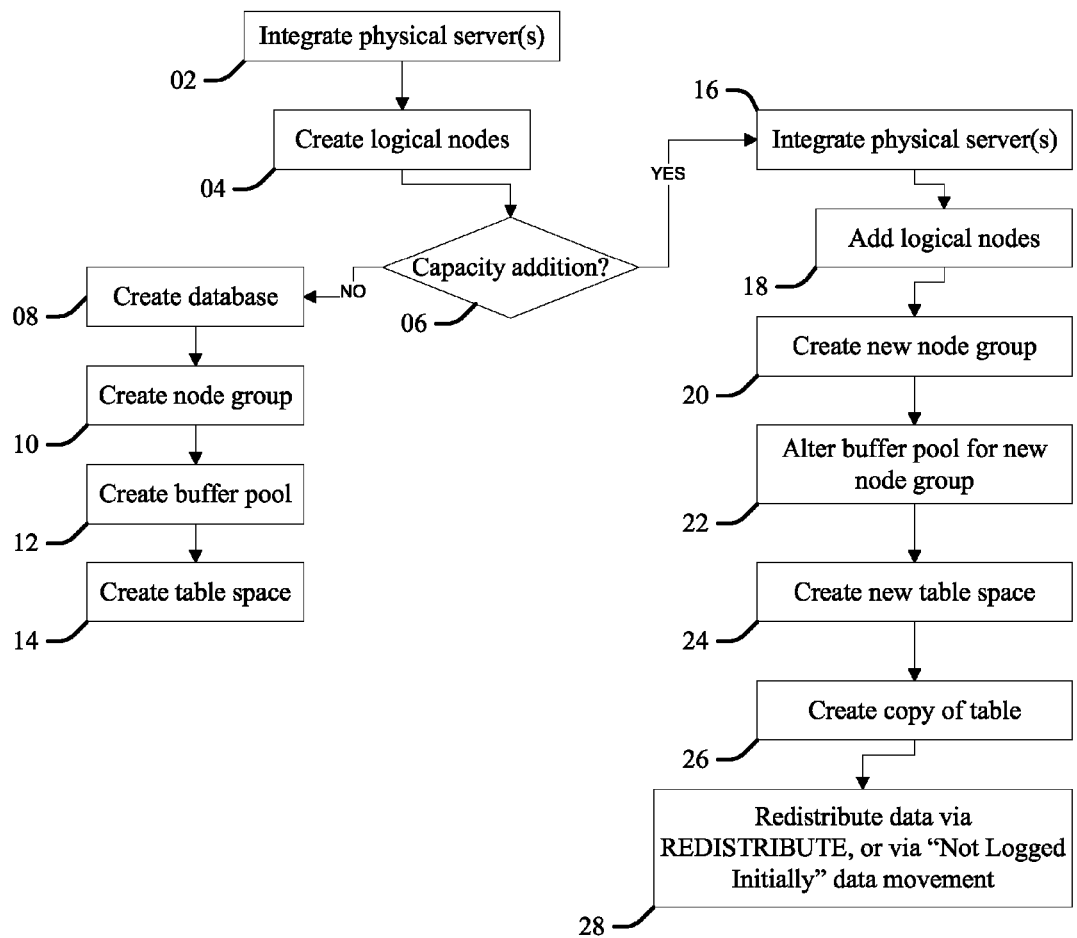
FIG. 1 is a flow chart illustration of a method, system or process for distributing and redistributing data to database to table space containers in a relational database structure according to an aspect of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

In a partitioned database, data may be redistributed among the partitions to balance data access, for example when some partitions contain more data than others, or when some partitions are accessed more frequently than others. DB2 databases must generally be redistributed when customers add capacity to the multi-partitioned environments of the DB2 Database. This may be accomplished by using a DB2 redistribute command to redistribute the data to other nodes, or by performing the activity in an off-line mode using a not-logged, insert-based approach. For example, FIG. 1 illustrates an approach for distributing and redistributing data to database to table space containers in a relational database structure. At 02 one or more physical servers are integrated with a relational database structure and at 04 logical nodes of the relational database structure are created. If capacity is not being added to the database (at 06), then at 08 the database is created, at 10 node groups are created within the table space of the database, at 12 buffer pools are created and at 14 table space is created to define containers.

In response to a request to increase capacity at 06, the physical server(s) are integrated with the relational database structure at 16 and logical nodes are added at 18. A new node group must be created at 20 to accommodate the added nodes, the buffer pool must be altered at 22 to accommodate the new node group, and new table space must be created at 24. A copy of the database table is then generated at 26 to enable redistribution of the database data at 28 to the new database node group, altered buffer pool and new table space structure, via the DB2 REDISTRIBUTE command, or via A "Not Logged Initially" or other off-line data movement.

The following operations and commands organized by indices PA-1 through PA-5 illustrate an example of an implementation pursuant to the illustration of FIG. 1:

(P1) Node Group Definition: db2 "create nodegroup test_ndpg on nodes (11, 12, 13 14, 15)"
(P2) Tablespace Definition: db2 "create tablespace test_TBS in nodegroup test_ndpg managed by database
    using (FILE '/db2fs/db2inst1/NODE0011/test_tbs1.dbf' 50000) on node(11)
    using (FILE '/db2fs/db2inst1/NODE0012/test_tbs2.dbf' 50000) on node(12)
    using (FILE '/db2fs/db2inst1/NODE0013/test_tbs3.dbf' 50000) on node(13)
    using (FILE '/db2fs/db2inst1/NODE0014/test_tbs4.dbf' 50000) on node(14)
    using (FILE '/db2fs/db2inst1/NODE0015/test_tbs5.dbf' 50000) on node(15)";
(P3) Capacity Addition: Team integrated physical servers containing new logical nodes: (21, 22, 23, 24 25);
(P4) Create New Node Group: db2 "create nodegroup capadd_ndpg on nodes (11, 12, 13 14, 15, 21, 22, 23, 24, 25)";
(P5) Create New Tablespace: db2 "create tablespace capadd_TBS in nodegroup capadd_ndpg managed by database
    using (FILE '/db2fs/db2inst1/NODE0011/test_tbs1.dbf' 50000) on node(11)
    using (FILE '/db2fs/db2inst1/NODE0012/test_tbs2.dbf' 50000) on node(12)
    using (FILE '/db2fs/db2inst1/NODE0013/test_tbs3.dbf' 50000) on node(13)
    using (FILE '/db2fs/db2inst1/NODE0014/test_tbs4.dbf' 50000) on node(14)
    using (FILE '/db2fs/db2inst1/NODE0015/test_tbs5.dbf' 50000) on node(15)
    using (FILE '/db2fs/db2inst1/NODE0021/test_tbs1.dbf' 50000) on node(21)
    using (FILE '/db2fs/db2inst1/NODE0022/test_tbs2.dbf' 50000) on node(22)
    using (FILE '/db2fs/db2inst1/NODE0023/test_tbs3.dbf' 50000) on node(23)
    using (FILE '/db2fs/db2inst1/NODE0024/test_tbs4.dbf' 50000) on node(24)
    using (FILE '/db2fs/db2inst1/NODE0025/test_tbs5.dbf' 50000) on node(25)"

Achieving redistribution via use of on-line DB2 redistribution commands at step 28 requires meeting a number of prerequisites. For example, log files must be large enough for the data redistribution operation, and the log file on each affected partition must be large enough to accommodate INSERT and DELETE operations performed there. If the data in a database partition group contains replicated materialized query tables, these must be dropped before redistributing the data, and recreated after the data is redistributed.

Further, a variety of DB2 operations that may be performed on objects of a database partition group while a redistribution utility is running cannot be performed on the table that is being redistributed. For example, creating indexes on other tables via a CREATE INDEX statement uses the partitioning map of the affected table. Dropping other tables via a DROP TABLE statement uses the partitioning map of the affected table. Dropping indexes on other tables via a DROP INDEX statement uses the partitioning map of the affected table.

Restrictions are also placed on querying other tables, updating other tables, creating new tables in a table space defined in the database partition group. More particularly, the CREATE TABLE statement uses the target partitioning map to create table spaces in the database partition group. Moreover, some DB2 operations are prohibited while a redistribution utility is running, for example, starting another redistribution operation on the database partition group; executing an ALTER TABLE statement on any table in the database partition group; dropping the database partition group; or altering the database partition group.

To redistribute data across partitions in a database partition group, a database administrator may connect to the database partition that contains the system catalog tables, perform any necessary prerequisite tasks, issue a REDISTRIBUTE DATABASE PARTITION GROUP command, and recreate any replicated materialized query tables dropped before redistribution after redistribution is complete. Such redistribution options are problematic. The available solutions may not be amenable to monitoring, presenting a black box to the database administrator wherein determining a successful outcome of the redistribution command must await completion of execution of the command, and rely on reporting by the command as to whether it was successful or had failed. This results in effort and time inefficiencies in the case of a failed operation. Alternative, off-line approaches may require directly controlled execution of the different processes and steps of the task, and also system downtime which impacts other user processes.

Figure 2:
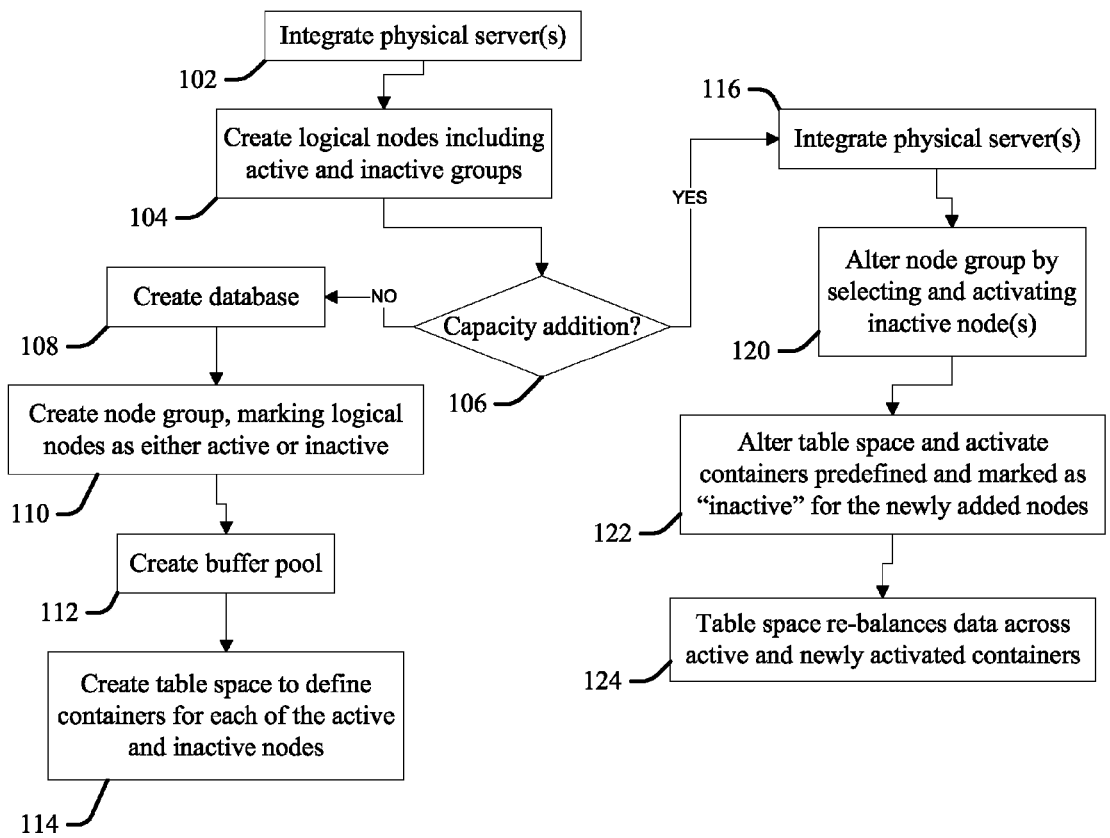
FIG. 2 is a flow chart illustration of a method, system or process for distributing data of a database to table space containers as a function of active and inactive node designations according to an aspect of the present invention.

FIG. 2 illustrates distributing data of a database to table space containers as a function of active and inactive node designations according to an aspect of the present invention. At 102 a physical server is integrated with the relational database structure. In some aspects, integrating the relational database structure is performed automatically by a processor and in others by a processor under the control and direction of a database administrator. Integrating the relational database structure may include determining the environment that will be enabled, and an installation configuration that includes a process server test environment, supports an enterprise service bus, a business monitor, and/or an integration designer to build business applications that involve human tasks (tasks that are performed by people and thus require user interfaces), etc.

At 104 two groups of logical nodes of the relational database structure are created, a first plurality of logical nodes that are defined as active, and a second plurality that are defined as inactive. In one aspect, this status of the nodes is determined by an active/inactive flag field that may be toggled between respective active and inactive states, though other mechanisms will be apparent to one skilled in the art.

If capacity is not added (at 106), at 108 the database is created, and at 110 node groups are created within the table space of the database. More particularly, creating the node groups at 110 includes marking the logical nodes as either active (thus, currently available for use in data storage and distribution) or as inactive (and thus not currently available for use in data storage and distribution, but instead for future data operations), in one aspect, based on current and future capacity plans. At 112 buffer pools are created and at 114 table space is created to define containers for each of the active and inactive nodes.

In response to a request to increase capacity at 106, the physical server(s) are integrated with the relational database structure at 116, and at 120 the existing node group is altered by selecting and activating one or more (or all) of the inactive nodes (for example, toggling their active/inactive flag fields from inactive to active) as a function of the increased capacity indicated or requested at 106.

At 122 the existing table space is altered and containers predefined and marked as "inactive" are activated. More particularly, only containers for the logical nodes newly activated are activated, wherein the containers for others of the inactive nodes are not activated and remain inactive. Thus, at 124 the table space automatically re-balances the database data across the active and the newly activated containers in the background while the table data is accessible. The re-balancing is achieved at 124 without the use of the REDISTRIBUTE command, or by performing the activity in an off-line mode using a not-logged, insert-based or other off-line data movement approach.

The following operations and commands illustrate an aspect of the present invention implemented in a DB2 relational database structure according to the example of FIG. 2:

```
(i) Node Group Definition: db2 "create nodegroup test_ndpg on
nodes
    (11 Active,
    12 Active,
    13 Active,
    14 Active,
    15 Active,
    21 Inactive,
    22 Inactive,
    23 Inactive,
    24 Inactive,
    25 Inactive)";
(ii) Tablespace Definition: db2 "create tablespace test_TBS in
nodegroup test_ndpg managed by database
    using (FILE '/db2fs/db2inst1/NODE0011/test_tbs1.dbf' 50000) on
    node(11) Active,
    using (FILE '/db2fs/db2inst1/NODE0012/test_tbs2.dbf' 50000) on
    node(12) Active,
    using (FILE '/db2fs/db2inst1/NODE0013/test_tbs3.dbf' 50000) on
    node(13) Active,
    using (FILE '/db2fs/db2inst1/NODE0014/test_tbs4.dbf' 50000) on
    node(14) Active,
    using (FILE '/db2fs/db2inst1/NODE0015/test_tbs5.dbf' 50000) on
    node(15) Active,
    using (FILE '/db2fs/db2inst1/NODE0021/test_tbs1.dbf' 50000) on
    node(21) Inactive,
    using (FILE '/db2fs/db2inst1/NODE0022/test_tbs2.dbf' 50000) on
    node(22) Inactive,
    using (FILE '/db2fs/db2inst1/NODE0023/test_tbs3.dbf' 50000) on
    node(23) Inactive,
    using (FILE '/db2fs/db2inst1/NODE0024/test_tbs4.dbf' 50000) on
    node(24) Inactive,
    using (FILE '/db2fs/db2inst1/NODE0025/test_tbs5.dbf' 50000) on
    node(25) Inactive";
(iii) Capacity Definition Note: Team integrated physical servers
containing the inactive logical nodes: (21, 22, 23, 24 25);
(iv) Alter the Node Group: db2 "alter nodegroup test_ndpg on nodes
    (21 Active,
    22 Active,
    23 Active,
    24 Active,
    25 Active)";
(v) Alter the Tablespace: db2 "alter tablespace test_TBS activate
containers
    using (FILE '/db2fs/db2inst1/NODE0021/test_tbs1.dbf' 50000) on
    node(21) Active,
    using (FILE '/db2fs/db2inst1/NODE0022/test_tbs2.dbf' 50000) on
    node(22) Active,
    using (FILE '/db2fs/db2inst1/NODE0023/test_tbs3.dbf' 50000) on
    node(23) Active,
    using (FILE '/db2fs/db2inst1/NODE0024/test_tbs4.dbf' 50000) on
    node(24) Active,
    using (FILE '/db2fs/db2inst1/NODE0025/test_tbs5.dbf' 50000) on
    node(25) Active".
```

By enabling a database management system to predefine inactive logical nodes, logical node paths and table space container paths, a database administrator may reflag logical node and the table space containers already defined as active, integrating physical hardware and physical storage paths to the environment in an on-line process. Once the paths are activated, the buffer pools, node groups and table spaces get automatically altered to use the pre-defined containers and start re-balancing the table space and spreading data to newly added containers. No downtime is required for redistributing the data in such multi-partitioned environments in the aspects described in FIG. 2.

Figure 3:
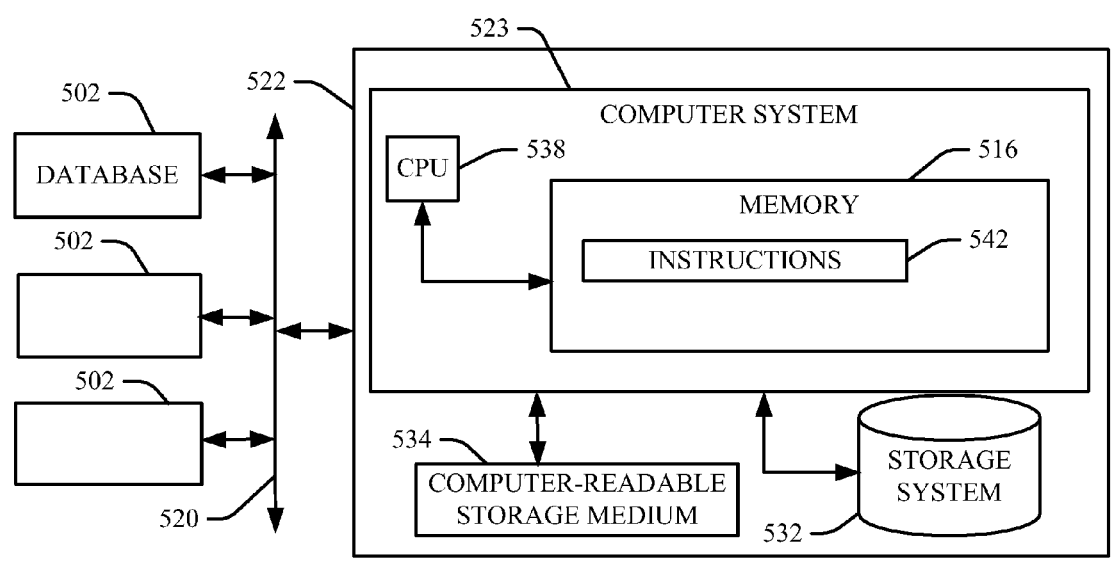
FIG. 3 is a block diagram illustration of a computer system implementation of an aspect of the present invention.

Referring now to FIG. 3, an exemplary computerized implementation of an aspect of the present invention includes a computer system or other programmable device 522 in network communication 520 with one or more databases 502. The programmable device 522 thus provides for distributing data of a database to table space containers as a function of active and inactive node designations as described above with respect to FIG. 2. Instructions 542 reside within computer readable code in a computer readable memory 516, or in a computer readable storage system 532, or other tangible computer readable storage medium 534 that is accessed by a Central Processing Unit (processor or CPU) 538 of a computer system or infrastructure 523 of the programmable device 522. Thus, the instructions, when implemented by the processor 538, cause the processor 538 to automatically redistribute data to activated, pre-defined table space containers in response to an increase in capacity as described above with respect to FIG. 2.

In one aspect, the present invention may also perform process steps of the invention on a subscription, advertising, and/or fee basis. That is, a service provider could offer to integrate computer-readable program code into the computer system 522 to enable the computer system 522 to distribute data of a database to table space containers as a function of active and inactive node designations as described above with respect to FIG. 2. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for distributing data of a database to table space containers as a function of active and inactive node designations, the method comprising:
   in response to integrating a relational database on at least one physical server, a processor creating a plurality of active logical nodes and a plurality of inactive logical nodes;
   the processor creating database node groups by marking the active nodes as available for use in data storage and distribution and marking the inactive nodes as unavailable for use in data storage and distribution;
   the processor creating table space for the relational database by defining containers for each of the active and inactive nodes;
   in response to a request to increase data capacity in the relational database, altering at least one of the created database node groups by selecting and activating one of the inactive nodes into an activated node;
   in response to the activating of the selected inactive node into the activated node, altering the table space by activating the defined container that is associated with the activated node; and
   automatically re-balancing table data of the relational database across the table space active containers and the activated defined container that is associated with the activated node in response to the step of activating the defined container, wherein the table data is accessible to a user of the database during the re-balancing the table data.

2. The method of claim 1, further comprising:
   integrating computer-readable program code into a computer system comprising the processor, a computer readable memory and a computer readable storage medium, wherein the computer readable program code is embodied on the computer readable storage medium and comprises instructions that, when executed by the processor via the computer readable memory, cause the processor to perform the steps of creating the plurality of active logical nodes and the plurality of inactive logical nodes in response to integrating the relational database on the at least one physical server, creating the database node groups by marking the active nodes as available for use in data storage and distribution and marking the inactive nodes as unavailable for use in data storage and distribution, creating the table space for the relational database by defining the containers for each of the active and inactive nodes, altering the at least one of the created database node groups by selecting and activating one of the inactive nodes into an activated node, altering the table space by activating the defined container that is associated with the activated node, and automatically re-balancing the table data of the relational database across the table space active containers and the activated defined container that is associated with the activated node in response to the activating the defined container.

3. The method of claim 1, wherein the relational database is a DB2 database, and wherein the step of automatically re-balancing table data of the relational database across the active and the activated containers is achieved without the use of a DB2 REDISTRIBUTE command.

4. The method of claim 1, wherein the step of automatically re-balancing table data of the relational database across the active and the activated containers is achieved without performing the activity in an off-line mode using at least one of a not-logged and an insert-based data movement approach.

5. The method of claim 1, further comprising:
   defining the first plurality of logical nodes as active by setting an active/inactive flag of each of said first plurality of nodes to an active position;
   defining the second plurality of logical nodes as inactive by setting the active/inactive flag of each of said second plurality of nodes to an inactive position; and
   wherein the step of selecting and activating the inactive node into the activated node comprises toggling the active/inactive flag field of the selected inactive node from the inactive position to the active position.

6. The method of claim 5, further comprising:
   creating buffer pools for each of the active nodes and the inactive nodes; and
   wherein the step of the processor creating the table space for the relational database by defining containers for each of the active and inactive nodes is in response to the step of creating the buffer pools.

7. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   creates a plurality of active logical nodes and a plurality of inactive logical nodes in response to integrating a relational database on at least one physical server;
   creates database node groups by marking the active nodes as available for use in data storage and distribution and marking the inactive nodes as unavailable for use in data storage and distribution;
   creates table space for the relational database by defining containers for each of the active and inactive nodes;
   alters at least one of the created database node groups by selecting and activating one of the inactive nodes into an activated node in response to a request to increase data capacity in the relational database;

alters the table space by activating the defined container that is associated with the activated node in response to the activation of the selected inactive node into the activated node; and automatically re-balances table data of the relational database across the table space active containers and the activated defined container that is associated with the activated node in response to the activation of the defined container, wherein the table data is accessible to a user of the database while the processor re-balances the table data.

8. The system of claim 7, wherein the relational database is a DB2 database, and wherein the processor automatically re-balances the table data of the relational database across the active and the activated containers without using a DB2 REDISTRIBUTE command.

9. The system of claim 7, wherein the processor automatically re-balances the table data of the relational database across the active and the activated containers without performing the activity in an off-line mode using at least one of a not-logged and an insert-based data movement approach.

10. The system of claim 7, wherein the processor, when executing program instructions stored on the computer-readable storage medium via the computer readable memory, further:

defines the first plurality of logical nodes as active by setting an active/inactive flag of each of said first plurality of nodes to an active position;

defines the second plurality of logical nodes as inactive by setting the active/inactive flag of said second plurality of nodes to an inactive position; and activates the inactive node into the activated node by toggling the active/inactive flag field of the selected inactive node from the inactive position to the active position.

11. The system of claim 10, wherein the processor, when executing program instructions stored on the computer-readable storage medium via the computer readable memory, further:

creates buffer pools for each of the active nodes and the inactive nodes; and creates the table space for the relational database by defining containers for each of the active and inactive nodes in response to creating the buffer pools.

12. A computer program product for distributing data of a database to table space containers as a function of active and inactive node designations, the computer program product comprising:

a computer readable storage medium having computer readable program code embodied therewith, the computer readable program code comprising instructions for execution by a processor, that cause the processor to:

create a plurality of active logical nodes and a plurality of inactive logical nodes in response to integrating a relational database on at least one physical server;

create database node groups by marking the active nodes as available for use in data storage and distribution and marking the inactive nodes as unavailable for use in data storage and distribution;

create table space for the relational database by defining containers for each of the active and inactive nodes alter at least one of the created database node groups by selecting and activating one of the inactive nodes into an activated node in response to a request to increase data capacity in the relational database;

alter the table space by activating the defined container that is associated with the activated node in response to the activation of the selected inactive node into the activated node; and automatically re-balance table data of the relational database across the table space active containers and the activated defined container that is associated with the activated node in response to the activation of the defined container, wherein the table data is accessible to a user of the database while the processor re-balances the table data.

13. The computer program product of claim 12, wherein the relational database is a DB2 database, and wherein the computer readable program code instructions, when executed by the processor, further cause the processor to automatically re-balance the table data of the relational database across the active and the activated containers without using a DB2 REDISTRIBUTE command.

14. The computer program product of claim 12, wherein the computer readable program code instructions, when executed by the processor, further cause the processor to automatically re-balance the table data of the relational database across the active and the activated containers without performing the activity in an off-line mode using at least one of a not-logged and an insert-based data movement approach.

15. The computer program product of claim 12, wherein the computer readable program code instructions, when executed by the processor, further cause the processor to:

define the first plurality of logical nodes as active by setting an active/inactive flag of each of said first plurality of nodes to an active position;

define the second plurality of logical nodes as inactive by setting the active/inactive flag of said second plurality of nodes to an inactive position; and activate the inactive node into the activated node by toggling the active/inactive flag field of the selected inactive node from the inactive position to the active position.

16. The computer program product of claim 15, wherein the computer readable program code instructions, when executed by the processor, further cause the processor to:

create buffer pools for each of the active nodes and the inactive nodes; and create the table space for the relational database by defining containers for each of the active and inactive nodes in response to creating the buffer pools.

17. The computer program product of claim 16, wherein the computer readable program code instructions, when executed by the processor, further cause the processor to support an enterprise service bus.

* * * * *